United States Patent
Mitsuta et al.

(10) Patent No.: US 10,128,520 B2
(45) Date of Patent: Nov. 13, 2018

(54) FUEL CELL

(71) Applicant: HONDA MOTOR CO., LTD., Tokyo (JP)

(72) Inventors: Naoki Mitsuta, Wako (JP); Hiroshi Sohma, Wako (JP); Yukihito Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 944 days.

(21) Appl. No.: 14/223,988

(22) Filed: Mar. 24, 2014

(65) Prior Publication Data
US 2014/0287339 A1   Sep. 25, 2014

(30) Foreign Application Priority Data
Mar. 25, 2013   (JP) .................................. 2013-061246

(51) Int. Cl.
*H01M 8/10* (2016.01)
*H01M 8/1004* (2016.01)
(Continued)

(52) U.S. Cl.
CPC ....... *H01M 8/1004* (2013.01); *H01M 8/0273* (2013.01); *H01M 8/0284* (2013.01); *H01M 2008/1095* (2013.01)

(58) Field of Classification Search
CPC ............ H01M 8/0273; H01M 8/1004; H01M 8/0284; H01M 2008/1095
See application file for complete search history.

(56) References Cited

U.S. PATENT DOCUMENTS

| 7,993,499 | B2 | 8/2011 | Zuber et al. |
| 8,343,321 | B2 | 1/2013 | Zuber et al. |

(Continued)

FOREIGN PATENT DOCUMENTS

| JP | 2007-066766 | 3/2007 |
| JP | 2008-041337 | 2/2008 |
| JP | 2011-040290 | 2/2011 |

OTHER PUBLICATIONS

Ramasamy, Ramaraja P., et al. "Investigation of macro-and microporous layer interaction in polymer electrolyte fuel cells." International Journal of Hydrogen Energy 33.13 (2008): 3351-3367.*

*Primary Examiner* — Nicholas P D'Aniello
*Assistant Examiner* — Philip A. Stuckey
(74) *Attorney, Agent, or Firm* — Mori & Ward, LLP

(57) ABSTRACT

A fuel cell includes an electrolyte membrane electrode assembly and a resin frame member. The electrolyte membrane electrode assembly includes an electrolyte membrane, a first electrode and a second electrode. The resin frame member has a recess in which the first electrode, the electrolyte membrane, and a portion of a second electrode catalyst layer protruding from a second gas diffusion layer are disposed, and an insertion hole which is in communication with the recess and in which the second gas diffusion layer is inserted. A filling layer covering an outer edge portion of the second electrode catalyst layer and having an oxygen permeability of $2 \times 10^5$ ml/m$^2$·24 hr·atm or less is formed at least in a space between an inner wall of the insertion hole and the second gas diffusion layer.

27 Claims, 7 Drawing Sheets

(51) Int. Cl.
   *H01M 8/0273*    (2016.01)
   *H01M 8/0284*    (2016.01)
   *H01M 8/1018*    (2016.01)

(56) References Cited

U.S. PATENT DOCUMENTS

| | | |
|---|---|---|
| 8,394,551 B2 | 3/2013 | Zuber et al. |
| 2005/0014056 A1 | 1/2005 | Zuber et al. |
| 2007/0184326 A1* | 8/2007 | Sompalli ............ H01M 4/8605 429/450 |
| 2007/0215461 A1* | 9/2007 | Zuber ................. C25B 9/10 204/280 |
| 2010/0047649 A1* | 2/2010 | Yamada ............. H01M 8/0273 429/481 |

* cited by examiner

FUEL CELL

CROSS-REFERENCE TO RELATED APPLICATIONS

The present application claims priority under 35 U.S.C. § 119 to Japanese Patent Application No. 2013-061246, filed Mar. 25, 2013, entitled "Fuel Cell." The contents of this application are incorporated herein by reference in their entirety.

BACKGROUND

1. Field

The present disclosure relates to a fuel cell.

2. Description of the Related Art

A solid polymer electrolyte fuel cell includes an electrolyte membrane electrode assembly (hereinafter may be referred to as "MEA") constituted by an electrolyte membrane formed of a polymer ion exchange membrane, and an anode and a cathode that sandwich the electrolyte membrane. The anode and the cathode are each constituted by an electrode catalyst layer facing the electrolyte membrane and a gas diffusion layer disposed on the electrode catalyst layer.

A MEA of this type is sometimes configured as a step MEA. In a step MEA, one of the anode and the cathode includes a gas diffusion layer having a smaller surface area than the solid polymer electrolyte membrane while the other of the anode and the cathode includes a gas diffusion layer having the same surface area as the solid electrolyte membrane. In the step MEA, the outer wall of the MEA is surrounded by a resin frame member to reduce the amount of the electrolyte membrane, which is relatively expensive, to be used and to protect the electrolyte membrane, which is thin and has low strength.

Japanese Unexamined Patent Application Publication No. 2007-66766 (in particular, paragraph 0014 and FIG. 1A) discloses a fuel cell having the above-described structure. Referring to FIG. 1A of publication '766, this fuel cell includes an anode and a cathode sandwiching an electrolyte membrane, and the surface areas of the gas diffusion layer and the electrode catalyst layer of the cathode are smaller than those of the anode. The resin frame member has a recess that is indented from the lower side of the resin frame member toward the upper side of the resin frame member and an insertion hole extending from the ceiling of the recess and penetrating through the resin frame member. The anode and the electrolyte membrane are disposed in the recess and the cathode is inserted into the insertion hole.

The ceiling of the recess and the part of the electrolyte membrane protruding from the cathode and facing the ceiling are bonded to each other via an adhesive layer.

SUMMARY

According to one aspect of the present invention, a fuel cell includes an electrolyte membrane electrode assembly and a resin frame member. The electrolyte membrane electrode assembly includes an electrolyte membrane, a first electrode and a second electrode. The electrolyte membrane is formed of a solid polymer membrane. The first electrode and the second electrode sandwiches the electrolyte membrane. The resin frame member surrounds an outer wall of the electrolyte membrane electrode assembly. The first electrode includes a first electrode catalyst layer facing the electrolyte membrane and a first gas diffusion layer arranged on an outer side of the first electrode catalyst layer. The second electrode includes a second electrode catalyst layer facing the electrolyte membrane and a second gas diffusion layer arranged on an outer side of the second electrode catalyst layer. The second electrode catalyst layer is designed to have an area larger than that of the second gas diffusion layer so that an outer edge portion of the second electrode catalyst layer protrudes from the second gas diffusion layer. The electrolyte membrane is designed to have an area larger than that of the second electrode catalyst layer so that an outer edge portion of the electrolyte membrane protrudes from the second electrode catalyst layer. The resin frame member has a recess in which the first electrode, the electrolyte membrane, and a portion of the second electrode catalyst layer protruding from the second gas diffusion layer are disposed, and an insertion hole which is in communication with the recess and in which the second gas diffusion layer is inserted. A filling layer covering the outer edge portion of the second electrode catalyst layer and having an oxygen permeability of $2\times10^5$ ml/m$^2$·24 hr·atm or less is formed at least in a space between an inner wall of the insertion hole and the second gas diffusion layer.

According to another aspect of the present invention, a fuel cell includes an electrolyte membrane electrode assembly, a resin frame member, and a filling layer. The electrolyte membrane electrode assembly has an outer wall and includes an electrolyte membrane, a first electrode and a second electrode. The electrolyte membrane has a solid polymer membrane. The first electrode and the second electrode sandwiches the electrolyte membrane therebetween. The first electrode includes a first electrode catalyst layer and a first gas diffusion layer. The first electrode catalyst layer has a first catalyst layer surface facing the electrolyte membrane and a second catalyst layer surface opposite to the first catalyst layer surface. The first gas diffusion layer is provided on a side of the second catalyst layer surface. The second electrode includes a second electrode catalyst layer and a second gas diffusion layer. The second electrode catalyst layer has a third catalyst layer surface facing the electrolyte membrane and a fourth catalyst layer surface opposite to the third catalyst layer surface. The second gas diffusion layer is provided on a side of the fourth catalyst layer surface. The second electrode catalyst layer has an area larger than an area of the second gas diffusion layer so that a first outer edge portion of the second electrode catalyst layer protrudes from the second gas diffusion layer and smaller than an area of the electrolyte membrane so that a second outer edge portion of the electrolyte membrane protrudes from the second electrode catalyst layer. The resin frame member surrounds the outer wall of the electrolyte membrane electrode assembly and includes a recess and an insertion hole. The first electrode, the electrolyte membrane, and the second electrode catalyst layer protruding from the second gas diffusion layer are disposed in the recess. The insertion hole is in communication with the recess. The second gas diffusion layer is provided in the insertion hole. The filling layer is provided at least in a space between an inner wall of the insertion hole and the second gas diffusion layer to cover the first outer edge portion of the second electrode catalyst layer. The filling layer has an oxygen permeability of $2\times10^5$ ml/m$^2$·24 hr·atm or less.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
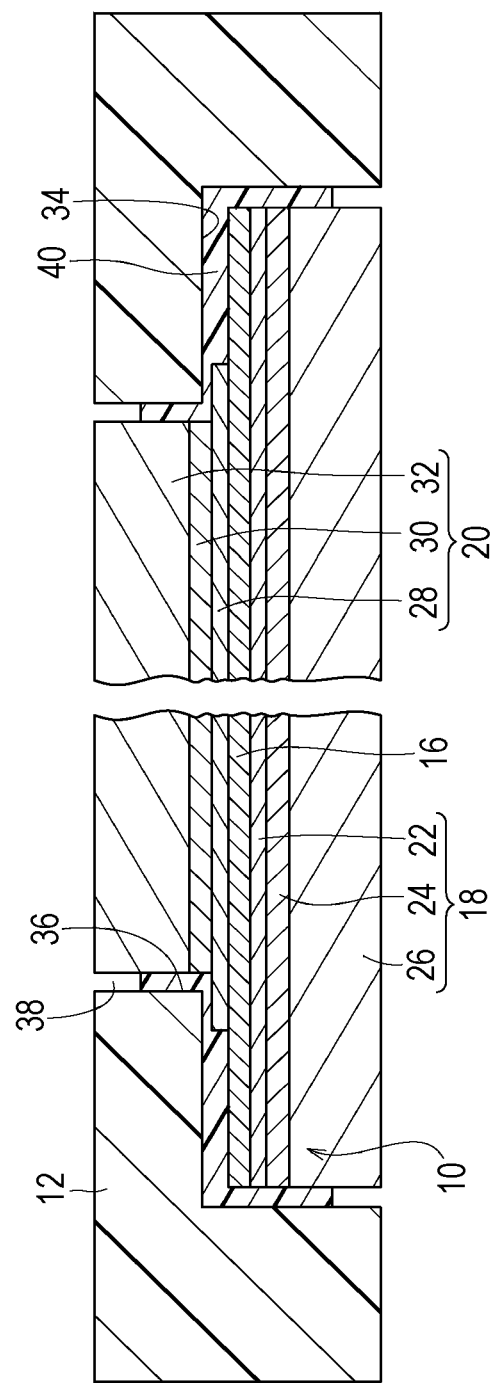
FIG. 1 is a schematic vertical cross-sectional view of an assembly constituting a fuel cell according to an embodiment.

The embodiments will now be described with reference to the accompanying drawings, wherein like reference numerals designate corresponding or identical elements throughout the various drawings.

The embodiments of fuel cells will now be described in detail with reference to the attached drawings.

Referring to FIG. 1, a fuel cell according to an embodiment includes an assembly 14 that includes an electrolyte membrane electrode assembly (step MEA) 10 supported by a resin frame member 12. This assembly 14 is interposed between a pair of separators (not shown in the drawing) to form a unit cell. FIG. 1 is a schematic vertical cross-sectional view of the assembly 14.

The step MEA 10 includes, for example, an electrolyte membrane 16 constituted by a thin perfluorosulfonic acid membrane impregnated with water, and an anode 18 (first electrode) and a cathode 20 (second electrode) that sandwich the electrolyte membrane 16. The electrolyte membrane 16 may be composed of a hydrocarbon compound.

The anode 18 includes a first electrode catalyst layer 22 bonded to one end surface of the electrolyte membrane 16, and a first intermediate layer 24 and a first gas diffusion layer 26 that are stacked on the first electrode catalyst layer 22. The first electrode catalyst layer 22, the first intermediate layer 24, and the first gas diffusion layer 26 are designed to have the same outline dimensions as the electrolyte membrane 16. In other words, the electrolyte membrane 16, the first electrode catalyst layer 22, the first intermediate layer 24, and the first gas diffusion layer 26 have the same surface area. Accordingly, the anode 18 side of the electrolyte membrane 16 is covered with the anode 18 and there are no exposed portions.

The cathode 20 includes a second electrode catalyst layer 28 bonded to the other end surface of the electrolyte membrane 16, and a second intermediate layer 30 and a second gas diffusion layer 32 that are stacked on the second electrode catalyst layer 28. The second intermediate layer 30 and the second gas diffusion layer 32 are designed to have the same outline dimensions (surface area) but the second electrode catalyst layer 28 is larger than the second intermediate layer 30 and the second gas diffusion layer 32. In other words, the surface area of the second electrode catalyst layer 28 is larger than those of the second intermediate layer 30 and the second gas diffusion layer 32. Accordingly, as the relevant part is enlarged and shown in FIG. 2, the outer edge portion of the second electrode catalyst layer 28 protrudes from the second intermediate layer 30 and the second gas diffusion layer 32.

The surface area of the second electrode catalyst layer 28 is designed to be smaller than that of the electrolyte membrane 16. Accordingly, the outer edge portion of the electrolyte membrane 16 protrudes from the second electrode catalyst layer 28.

The first electrode catalyst layer 22 and the second electrode catalyst layer 28 are obtained by, for example, providing catalyst particles, which are carbon black supporting platinum particles, on the two end surfaces of the electrolyte membrane 16.

The first intermediate layer 24 and the second intermediate layer 30 are, for example, provided to balance the water draining property and water retaining property of the anode 18 and the cathode 20. The first intermediate layer 24 and the second intermediate layer 30 are each a porous layer that contains an electron-conducting substance and a water-repelling resin.

Preferable examples of the electron-conducting substance include carbons. Examples of the water-repelling resin include crystalline fluorine resins, amorphous fluorine resins, and silicone resins such as tetrafluoroethylene-ethylene copolymers (ETFE), polyvinylidene fluoride (PVDF), polyvinyl fluoride (PVF), chlorotrifluoroethylene-ethylene copolymers (ECTFE), polytetrafluoroethylene (PTFE), tetrafluoroethylene-perfluoroalkyl vinyl ether copolymers (PFA), and tetrafluoroethylene-hexafluoropropylene copolymers (FEP).

The first gas diffusion layer 26 an the second gas diffusion layer 32 use carbon paper as a base material. Carbon paper is constituted by numerous carbon fibers in a cellulose matrix. This base material may contain a water-repelling resin such as FEP.

The resin frame member 12 is arranged to surround the outer wall of the step MEA 10 having the above-mentioned structure. The resin frame member 12 is composed of, for example, polyphenylene sulfide (PPS), polyphthalamide (PPA), polyethylene naphthalate (PEN), polyether sulfone (PES), liquid crystal polymer (LCP), polyvinylidene fluoride (PVDF), silicone rubber, fluorine rubber, or ethylene propylene rubber (EPDM).

The resin frame member 12 may be prepared by, for example, injection molding using a molten resin. Alternatively, the resin frame member 12 may be prepared from a resin film.

A recess 34 is formed in the resin frame member 12. The recess 34 extends from the lower end surface of the resin frame member 12 toward the upper end surface of the resin frame member 12 in FIG. 1. An insertion hole 36 in communication with the recess 34 is formed from the inner wall (ceiling) of the recess 34 to the upper end surface of the resin frame member 12.

Figure 2:
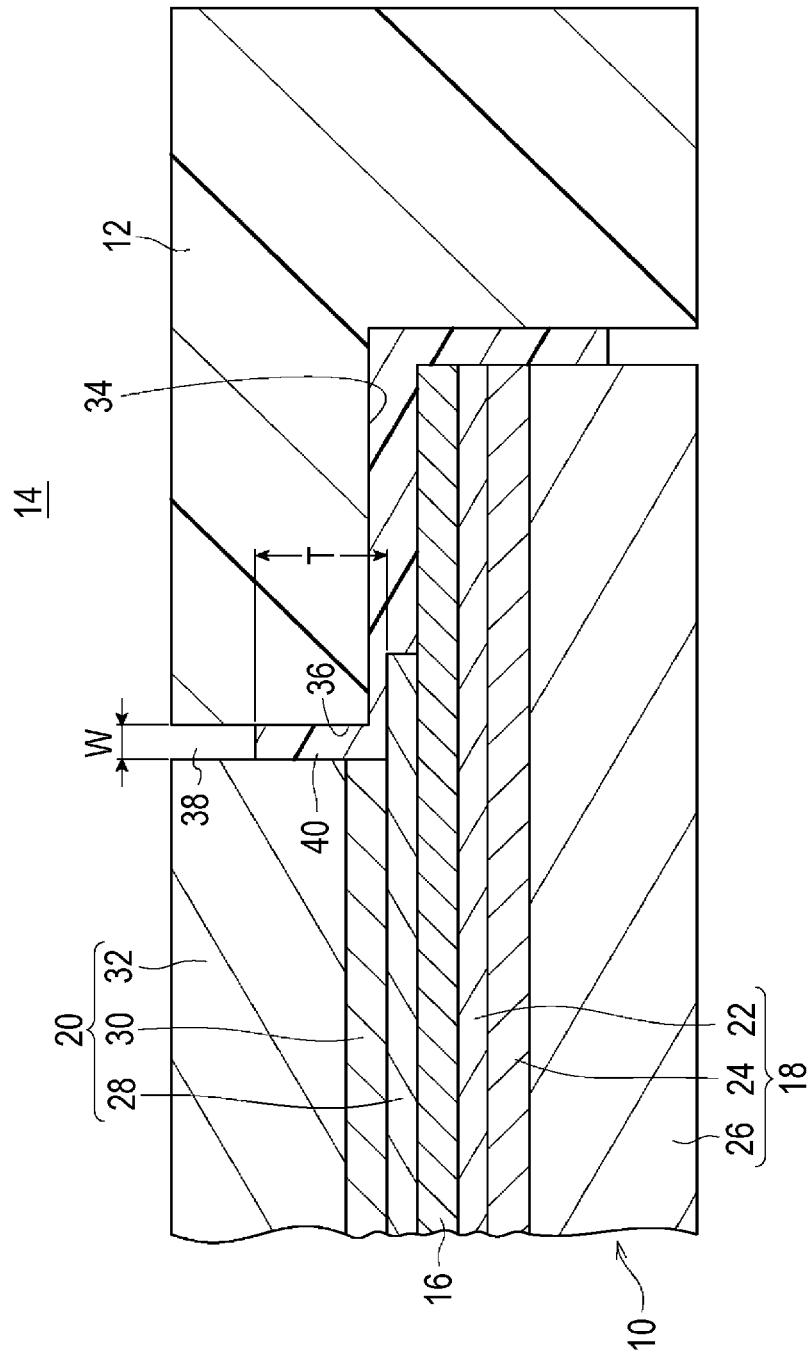
FIG. 2 is an enlarged view of a relevant part.

All parts of the anode 18 (the first gas diffusion layer 26, the first intermediate layer 24, and the first electrode catalyst layer 22), the electrolyte membrane 16, and the second electrode catalyst layer 28 of the cathode 20 are disposed inside the recess 34. Accordingly, as shown in FIG. 2, an outer edge portion of the electrolyte membrane 16 protruding from the second electrode catalyst layer 28 and an outer edge portion of the second electrode catalyst layer 28 protruding from the second intermediate layer 30 and the second gas diffusion layer 32 and overlapping the inner surface of the resin frame member 12 face the inner wall (ceiling) of the recess 34.

Figure 3:
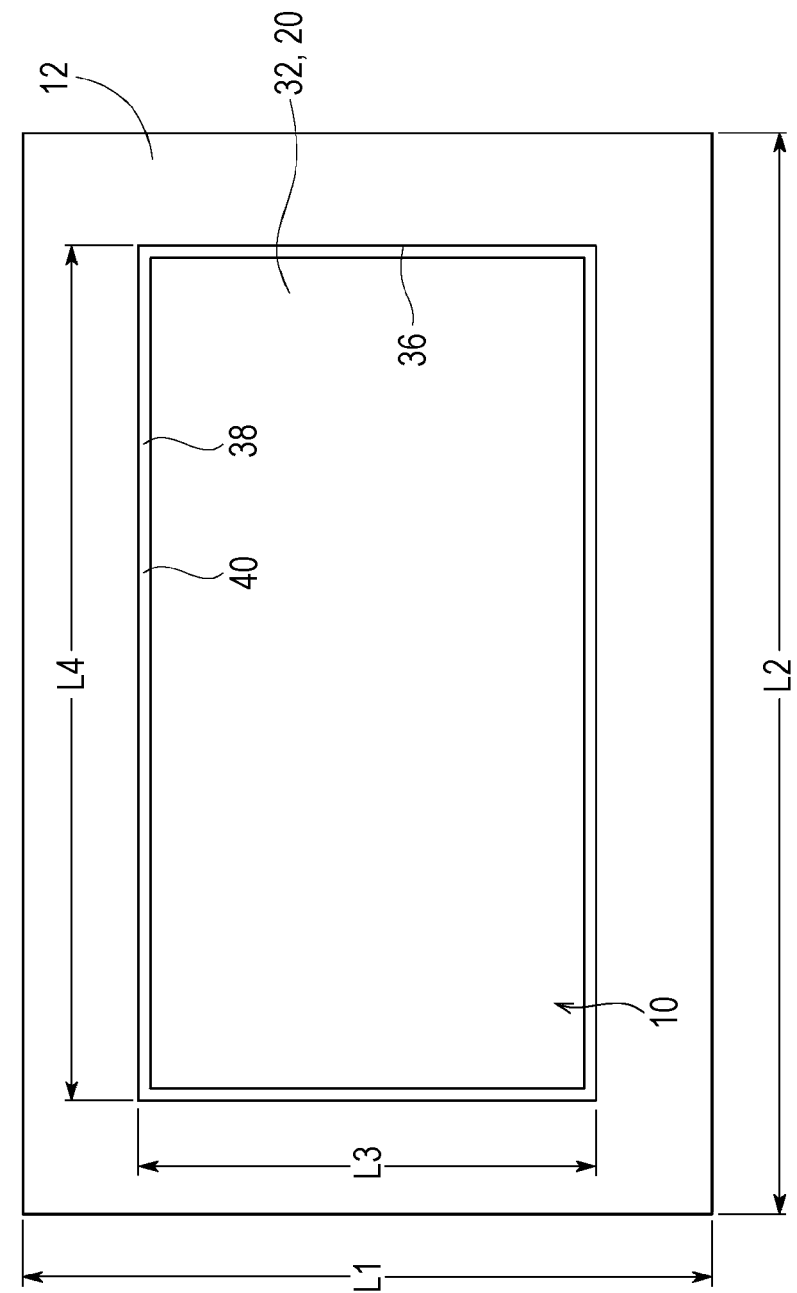
FIG. 3 is a plan view of the assembly shown in FIG. 1.

The second intermediate layer 30 and the second gas diffusion layer 32 are inserted into the insertion hole 36. Accordingly, as shown in FIG. 3, when the assembly 14 is viewed from the upper end surface side, the second gas diffusion layer 32 is surrounded by the resin frame member 12 having a frame shape.

A clearance 38 having a particular gap is formed between the inner wall of the insertion hole 36 and the second intermediate layer 30 and between the inner wall of the insertion hole 36 and the second gas diffusion layer 32. The clearance 38 is filled with a filler which forms a filling layer 40.

The filling layer 40 fills the space between the ceiling (inner wall) of the recess 34 and the second electrode catalyst layer 28 and the space between the ceiling (inner wall) of the recess 34 and the electrolyte membrane 16. In other words, the outer edge portion of the second electrode catalyst layer 28 protruding from the second intermediate layer 30 and the second gas diffusion layer 32 is covered with the filling layer 40. If needed, the filling layer 40 may be formed in the space between a side wall (inner wall) of the recess 34 and the anode 18 (refer to FIG. 1).

Examples of the material suitable for forming the filling layer 40 are organic compounds having high elasticity and functioning as a cushioning material. The organic compounds may be polymer compounds such as plastics. Specific examples thereof include polyphenylene sulfide (PPS), polyethylene terephthalate (PET), polybutylene terephthalate (PBT), urethane, liquid crystal polymer (LCP) epoxy, acryl, polypropylene (PP), polyethylene (PE), polytetrafluoroethylene (PTFE), polyphenylene ether (PPE), acrylonitrile-butadiene-styrene copolymers (ABS), polyphenylene oxide (PPO), polyacetal (POM), and plastic alloys of these. When a plastic is used, the plastic may contain an elastomer and/or an inorganic filler such as glass, carbon, talc, or titanium oxide.

The filling layer 40 may be composed of rubber. Specific examples of the rubber include fluorine-based compound rubber, butadiene rubber, isoprene rubber, acryl rubber, silicone rubber, urethane rubber, styrene butadiene rubber, chloroprene rubber, butyl rubber, acrylonitrile rubber, ethylene propylene rubber, epichlorohydrin rubber, hydrogenated nitrile rubber, chlorosulfonated polyethylene rubber, and norbornene rubber.

The filling layer 40 may be composed of any of various types of adhesives such as silicone-, epoxy-, acryl-, urethane-, or fluorine-based adhesives different from the material constituting the resin frame member 12. The adhesive may be a hot melt adhesive that exhibits adhesive power when it is heated to melt and cooled to solidify.

The oxygen permeability of the filling layer 40 per unit volume differs depending on the type of the filler. Accordingly, in this embodiment, the thickness T (distance between the upper end surface of the second electrode catalyst layer 28 and the upper end surface of the filling layer 40) or the width W (corresponding to the space between the second gas diffusion layer 32 and the resin frame member 12) of the filling layer 40 shown in FIG. 2 is adjusted so as to set the oxygen permeability to $2 \times 10^5$ ml/m$^2$·24 hr·atm or less in the portion between the upper end surface of the second electrode catalyst layer 28 and the upper end surface of the filling layer 40. Optimizing the thickness T and the width W in accordance with the material of the filler allows adjusting the permeability of the filling layer 40 to $2 \times 10^5$ ml/m$^2$·24 hr·atm or less.

The oxygen permeability can be measured by performing a measurement method prescribed in Japanese Industrial Standards (JIS) K 7126B on the filling layer 40 which is obtained by forming a film of a filler.

A portion of the filling layer 40 may permeate the first gas diffusion layer 26, the first intermediate layer 24, the second gas diffusion layer 32, and the second intermediate layer 30.

For example, the filling layer 40 near the recess 34 may permeate the first gas diffusion layer 26 and the filling layer 40 near the insertion hole 36 may permeate the second gas diffusion layer 32. According to this structure, the resin frame member 12 is further strongly bonded to the step MEA 10.

The height position of the upper end surface of the resin frame member 12 is substantially the same as the height position of the upper end surface of the second gas diffusion layer 32. In other words, the outer surface near the insertion hole 36 and the upper end surface of the second gas diffusion layer 32 are substantially flush with each other.

The fuel cell according to this embodiment includes a unit cell constituted by the assembly 14 having the above-described structure interposed between a pair of separators. The action and effects of the fuel cell will now be described in relation to the operation of the fuel cell.

The fuel cell generates power by using reactant gases supplied to the step MEA 10 through the separators. In particular, a fuel gas (for example, hydrogen) is supplied to the first gas diffusion layer 26 of the anode 18 and an oxidant gas (for example, air) is supplied to the second gas diffusion layer 32 of the cathode 20. Once the fuel gas passes through the first intermediate layer 24 and reaches the first electrode catalyst layer 22, hydrogen in the fuel gas is ionized in the first electrode catalyst layer 22. This gives protons and electrons. Protons move into the second electrode catalyst layer 28 by the proton conducting action of the electrolyte membrane 16.

The oxidant gas passes through the second intermediate layer 30 and reaches the second electrode catalyst layer 28. In the second electrode catalyst layer 28, oxygen in the oxidant gas, protons that have reached the second electrode catalyst layer 28, and the electrons that have been extracted from the anode 18 and reached the cathode 20 as they energize an external load such as a motor react with one another and generate water.

In this embodiment, as shown in FIG. 2, the filling layer 40 having an oxygen permeability of $2 \times 10^5$ ml/m$^{20}$·24 hr·atm or less is disposed in the clearance 38 formed between the inner wall of the insertion hole 36 and the second intermediate layer 30 and between the inner wall of the insertion hole 36 and the second gas diffusion layer 32. Thus, oxygen does not reach the outer edge portion of the second electrode catalyst layer 28 protruding from the second intermediate layer 30 and the second gas diffusion layer 32. As a result, the above-described reaction is prevented from occurring at the interface between the outer edge portion of the second electrode catalyst layer 28 and the electrolyte membrane 16.

As a result, the thickness of the portion of the electrolyte membrane 16 that comes into contact with the outer edge portion of the second electrode catalyst layer 28 is prevented from decreasing. Thus, degradation of the power generating properties of the fuel cell is avoided and the fuel cell exhibits good power generating properties over a long period of time.

According to this embodiment, the filling layer 40 protects the outer edge portion of the second electrode catalyst layer 28 protruding from the second intermediate layer 30 and the second gas diffusion layer 32 from oxygen. Accordingly, the fuel cell can maintain good power generating properties over a long period of time.

The embodiment described above is not limiting and various modifications and alterations are possible.

For example, although the anode 18 is used as a first electrode having a large surface area and the cathode 20 is used as a second electrode having a small surface area in the aforementioned embodiment, this may be reversed, i.e., the cathode 20 may be used as a first electrode having a large surface area and the anode 18 may be used as a second electrode having a small surface area.

In the filling layer 40, the adhesive layer that lies between the ceiling (inner wall) of the recess 34 and the second electrode catalyst layer 28, the adhesive layer that lies between the ceiling (inner wall) of the recess 34 and the electrolyte membrane 16, and the adhesive layer that lies between the side wall (inner wall) of the recess 34 and the anode 18 may be made by using the same material so that these adhesive layers are integrated with each other. Alternatively, the adhesive layers may be separately formed by using different materials.

The first intermediate layer 24 and the second intermediate layer 30 may be omitted.

The resin frame member 12 may be melted so that part of the resin frame member 12 permeates the first gas diffusion layer 26 and the second gas diffusion layer 32.

EXAMPLE

Figure 4:
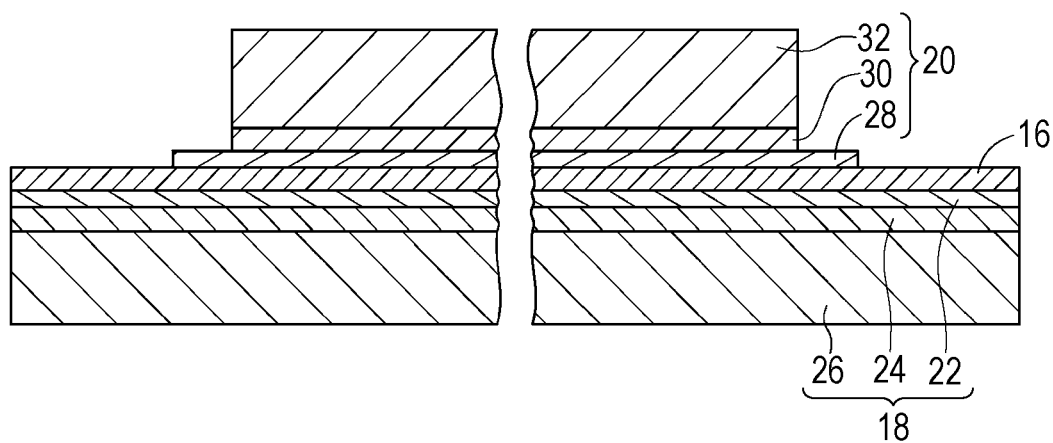
FIG. 4 is a schematic vertical cross-sectional view of an electrolyte membrane electrode assembly (step MEA) constituting the assembly shown in FIG. 1.

First, a step MEA 10 shown in FIG. 4 was prepared. In particular, a large piece having outer dimensions of 100 mm×140 mm and a small piece having outer dimensions of 73 mm×113 mm were cut out from carbon paper TGP-H060 produced by Toray Industries, Inc. A particle mixture containing carbon black and PTFE particles at a weight ratio of 4:6 was dispersed in ethylene glycol substantially uniformly so as to obtain a slurry. The slurry was applied to the large piece and the small piece and dried. As a result, a large composite including the first gas diffusion layer 26 formed of the large piece (carbon paper) and the first intermediate layer 24 on the first gas diffusion layer 26 and a small composite including the second gas diffusion layer 32 formed of the small piece (carbon paper) and the second intermediate layer 30 on the second gas diffusion layer 32 were obtained.

To a n-propanol/water (1:2) (vol) mixed solvent, platinum particles in an amount one-tenth of the weight of the mixed solvent were added. To the resulting mixture, ion-conducting polymer solution DE2020 (trade name of a perfluorosulfonic acid polymer compound solution produced by DuPont) was added so that the weight ratio of the platinum particles to the polymer component was 1:1.5. The resulting mixture was stirred and mixed in a planetary ball mill at 80 rpm for 120 minutes. As a result, an ink for a cathode catalyst was obtained.

The ink for a cathode catalyst was applied onto a PET film by screen printing. The application was conducted on a 76 mm×116 mm region at a platinum density of 0.5 mg/cm$^2$. The ink was then dried at 60° C. for 10 minutes and heated at 100° C. for 15 minutes at a reduced pressure. As a result, a cathode side electrode catalyst layer (second electrode catalyst layer 28) was obtained.

An anode side electrode catalyst layer was formed as follows. First, an ink for an anode catalyst was prepared as with preparation of the ink for the cathode catalyst described above except that the weight ratio of the platinum particles to the polymer component was 1:1. The ink for the anode catalyst was applied to a PET film different from the PET film described above by screen printing. The application was conducted on a 100 mm×140 mm region at a platinum density of 0.2 mg/cm$^2$. The ink was then dried at 60° C. for 10 minutes and heated at 100° C. for 15 minutes at a reduced pressure. As a result, an anode side electrode catalyst layer (first electrode catalyst layer 22) was obtained.

The anode side electrode catalyst layer and the cathode side electrode catalyst layer were respectively brought into contact with two end surfaces of Nafion NRE-211 (produced by DuPont) functioning as an electrolyte membrane 16 and hot-pressed with each other at 120° C. and 2.0 MPa for 8 minutes so as to bond the anode side electrode catalyst layer and the cathode side electrode catalyst layer to the electrolyte membrane 16. Then the PET film was removed.

The first intermediate layer 24 of the large composite was brought into contact with the anode side electrode catalyst layer and the second intermediate layer 30 of the small composite was brought into contact with the cathode side electrode catalyst layer. In this state, hot-pressing was performed at 120° C. and 2.0 MPa for 12 minutes. As a result, a step MEA 10 that includes the electrolyte membrane 16, a large anode 18, which is constituted by the large piece (first gas diffusion layer 26), the first intermediate layer 24, and the anode side electrode catalyst layer (first electrode catalyst layer 22), on one of the two end surfaces of the electrolyte membrane 16, and a small cathode 20, which is constituted by the small piece (second gas diffusion layer 32), the second intermediate layer 30, and the cathode side electrode catalyst layer (second electrode catalyst layer 28), on the other of the two end surfaces of the electrolyte membrane 16 was obtained. At this stage, the outer edge portion of the cathode side electrode catalyst layer protruded from the second intermediate layer 30 and the small piece.

The step MEA 10 was trimmed so that the maximum outer dimensions were 79.5 mm×119.5 mm.

In a separate process, A-900 (PPS) produced by Toray Industries, Inc., was injection-molded to prepare a resin frame member 12 having outer dimensions of 100 mm×140 mm on the upper end surface side (L1×L2 in FIG. 3), with a recess 34 having outer dimensions of 80 mm×120 mm and an insertion hole 36 having outer dimensions (L3×L4 in FIG. 3) of 74 mm×114 mm.

Figure 5:
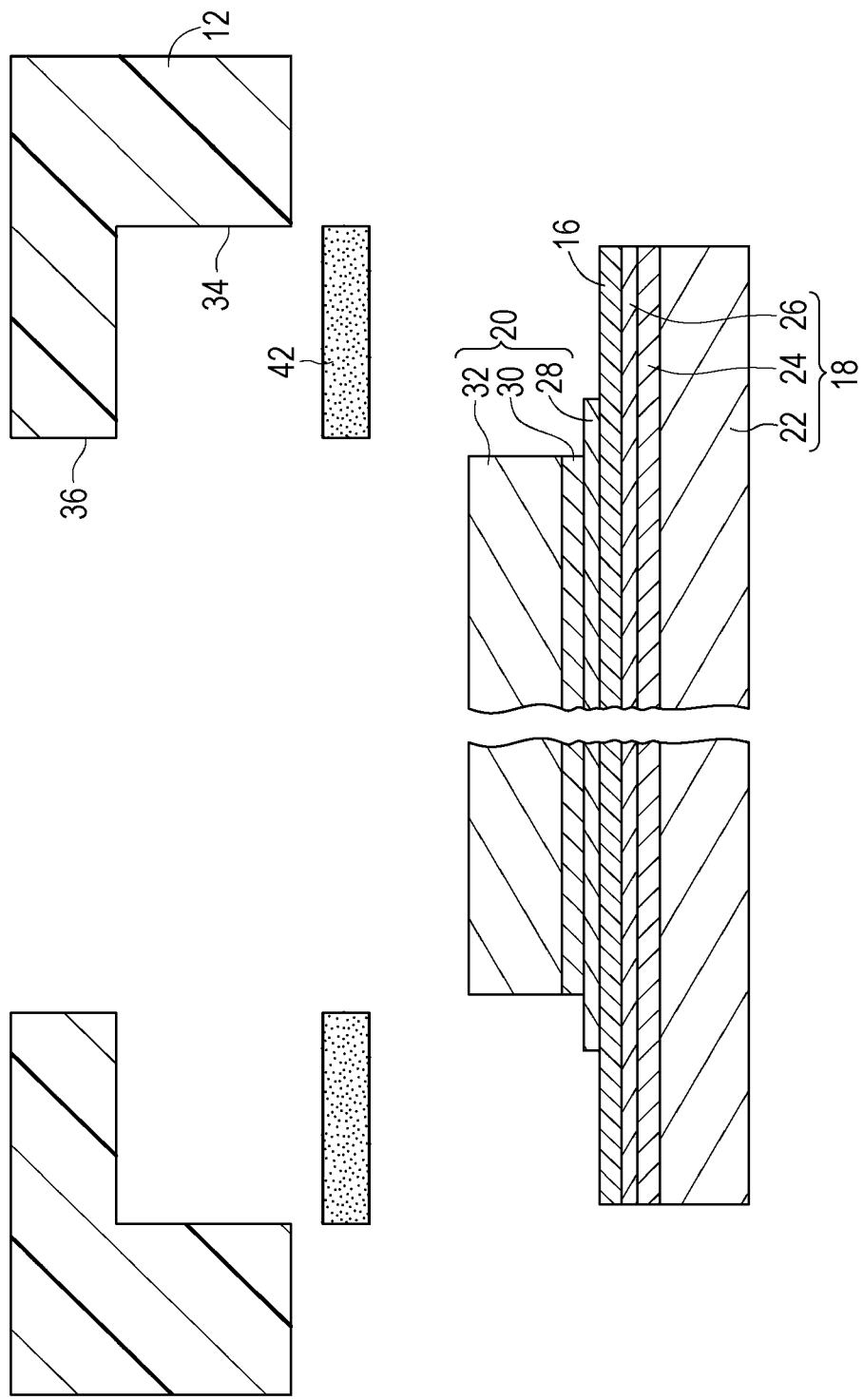
FIG. 5 is a schematic vertical cross-sectional view showing an adhesive interposed between the step MEA shown in FIG. 4 and a resin frame member.

As shown in FIG. 5, an adhesive 42 composed of TB1220G (trade name) produced by ThreeBond Holdings Co., Ltd., was applied to the space between the protruding outer edge portion of the cathode side electrode catalyst layer and the ceiling of the recess 34 in the resin frame member 12 so that the width and thickness of the applied adhesive were 3 mm and 90 µm, respectively. The application was conducted by using dispenser ML-606GX produced by Musashi Engineering Co., Ltd.

Then a 5 kg weight was placed on the resin frame member 12 with a PTFE sheet and a flat plate therebetween and TB1220G was cured by being retained in a drying furnace at 130° C. for 120 minutes.

Figure 6:
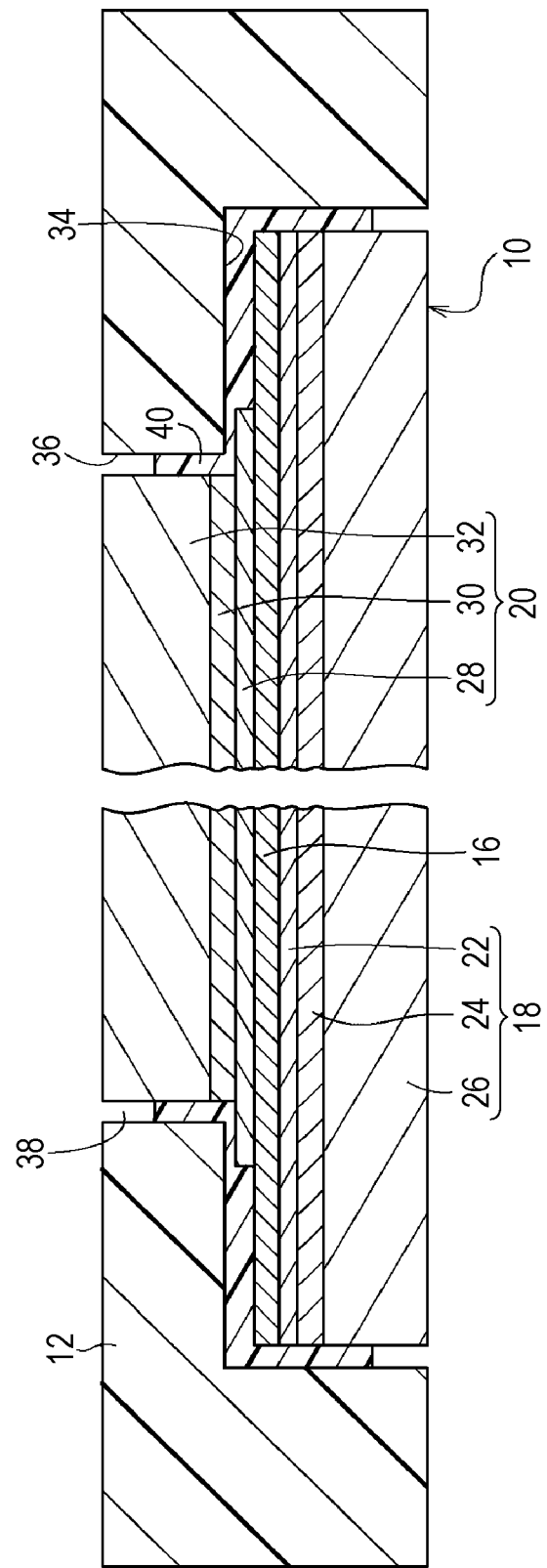
FIG. 6 is a schematic vertical cross-sectional view showing a filling layer disposed in a clearance between an inner wall of an insertion hole of the resin frame member and a second gas diffusion layer inserted into the insertion hole.

At this stage, a clearance 38 was present between the inner wall of the insertion hole 36 and the second intermediate layer 30 and between the inner wall of the insertion hole 36 and the small piece. Adequate amounts of TB1220G was introduced into the clearance 38 by using the dispenser ML-606GX and retained in a drying furnace at 130° C. for 120 minutes to be cured. As a result, an assembly 14 having a filling layer 40 was obtained as shown in FIG. 6.

Another assembly 14 was prepared as described above except that Aron Melt PES375S40 (trade name) produced by Toagosei Co., Ltd., or a Nafion solution DE2020 produced by DuPont was used to form a filling layer 40.

A unit cell was configured by using the assembly 14 obtained as above. A hydrogen gas was supplied to the anode 18 and an oxygen gas was supplied to the cathode 20. The open circuit state was continued for 3000 hours. The conditions were as follows: cell temperature: 80° C., hydrogen gas flow: 0.1 NL/min, hydrogen gas pressure: 160 kPa, hydrogen gas relative humidity: 50% Rh, oxygen gas flow: 0.3 NL/min, oxygen gas pressure: 160 kPa, oxygen gas relative humidity: 50% Rh.

A cross section of the assembly 14 was observed with a scanning electron microscope (SEM) to determine the thickness of the filling layer 40 and the decrease in thickness of the electrolyte membrane 16 from before supply of the hydrogen gas and oxygen gas.

Sample layers having the same thickness as the filling layer 40 were separately prepared from TB1220G, Aron Melt PES375S40, and DE2020. These samples layers were used to measure oxygen permeability in accordance with the measurement method prescribed in JIS K 7126B.

Figure 7:
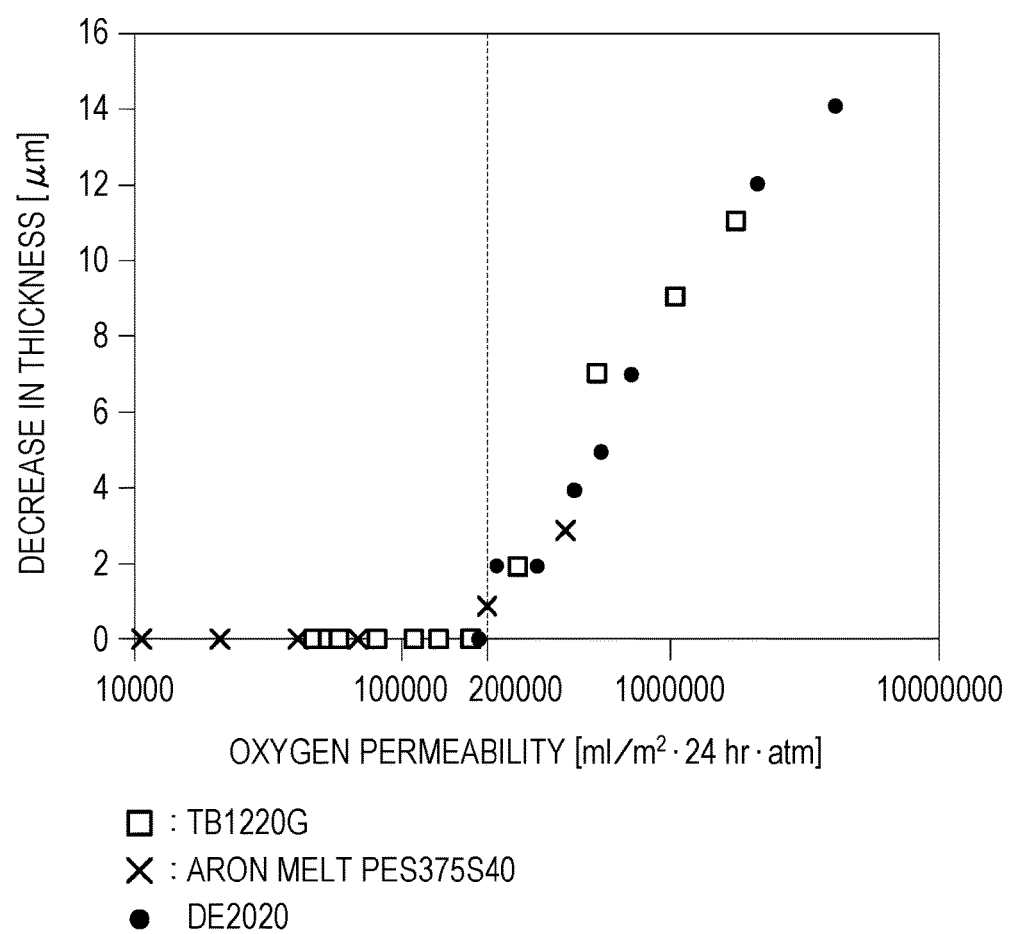
FIG. 7 is a graph showing the relationship between an oxygen permeability of the filling layer and the decrease in thickness of an electrolyte membrane.

The relationship between the oxygen permeability of the sample layers (filling layer 40) and the decrease in thickness of the electrolyte membrane 16 is shown in the graph in FIG. 7. In FIG. 7, open squares, cross marks, and solid circles respectively represent plots for TB1220G, Aron Melt PES375S40, and DE2020.

FIG. 7 shows that for all of TB1220G, Aron Melt PES375S40, and DE2020, the decrease in thickness of the electrolyte membrane 16 is prevented at an oxygen permeability of $2 \times 10^5$ ml/m$^2 \cdot$ hr$\cdot$atm or less. This clearly shows that the thickness of the electrolyte membrane 16 can be maintained by covering the protruding outer edge portion of the electrode catalyst layer with a filling layer 40 having an oxygen permeability of $2 \times 10^5$ ml/m$^2 \cdot$ hr$\cdot$atm or less and that the power generating properties of the fuel cell can be maintained thereby.

An embodiment of the present disclosure provides a fuel cell that includes an electrolyte membrane electrode assembly including an electrolyte membrane formed of a solid polymer membrane, and a first electrode and a second electrode sandwiching the electrolyte membrane; and a resin frame member surrounding an outer wall of the electrolyte membrane electrode assembly. The first electrode includes a first electrode catalyst layer facing the electrolyte membrane and a first gas diffusion layer arranged on an outer side of the first electrode catalyst layer and the second electrode includes a second electrode catalyst layer facing the electrolyte membrane and a second gas diffusion layer arranged on an outer side of the second electrode catalyst layer. The second electrode catalyst layer is designed to have an area larger than that of the second gas diffusion layer so that an outer edge portion of the second electrode catalyst layer protrudes from the second gas diffusion layer. The electrolyte membrane is designed to have an area larger than that of the second electrode catalyst layer so that an outer edge portion of the electrolyte membrane protrudes from the second electrode catalyst layer. The resin frame member has a recess in which the first electrode, the electrolyte membrane, and a portion of the second electrode catalyst layer protruding from the second gas diffusion layer are disposed, and an insertion hole which is in communication with the recess and in which the second gas diffusion layer is inserted. A filling layer covering the outer edge portion of the second electrode catalyst layer and having an oxygen permeability of $2 \times 10^5$ ml/m$^2 \cdot$ hr$\cdot$atm or less is formed at least in a space between an inner wall of the insertion hole and the second gas diffusion layer.

According to this structure, the filling layer protects a portion of the protruding outer edge portion of the second electrode catalyst layer, the portion facing the clearance between the inner wall of the insertion hole and the second gas diffusion layer. In other words, it is difficult for oxygen to reach this portion. Thus, occurrence of electrode reaction is prevented at the interface between the electrolyte membrane and this portion of the outer edge portion of the second electrode catalyst layer.

As a result, the thickness of the portion of the electrolyte membrane that comes into contact with the outer edge portion of the second electrode catalyst layer is prevented from decreasing. Accordingly, degradation of power generating properties of the fuel cell can be avoided. In other words, the fuel cell can maintain power generating properties over a long period of time.

The filling layer may also be present in a space between an inner wall of the recess and the second catalyst layer. According to this structure, all parts of the outer edge portion of the second electrode catalyst layer are protected by the filling layer. Accordingly, occurrence of electrode reaction is avoided at the interface between the electrolyte membrane and the outer edge portion of the second electrode catalyst layer. Thus, the aforementioned effects are further enhanced.

The filling layer may be formed of an organic compound. Polymer compounds are naturally also "organic compounds".

In particular, the filling layer may be formed of a plastic, a rubber, or an adhesive.

In this fuel cell, a filling layer having an oxygen permeability of $2 \times 10^5$ ml/m$^2 \cdot$ hr$\cdot$atm or less is formed in a clearance between the insertion hole in the resin frame member and the gas diffusion layer inserted into the insertion hole. This filling layer covers and protects the outer edge portion of the electrode catalyst layer protruding from the gas diffusion layer. As a result, occurrence of electrode reaction is avoided at the interface between the outer edge portion and the electrolyte membrane and thus the thickness of the electrolyte membrane is prevented from decreasing.

Due to the aforementioned reasons, the fuel cell can maintain power generating properties over a long period of time.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
    an electrolyte membrane electrode assembly including
        an electrolyte membrane formed of a solid polymer membrane, and
        a first electrode and a second electrode sandwiching the electrolyte membrane in a thickness direction; and
    a resin frame member surrounding an outer wall of the electrolyte membrane electrode assembly,
    wherein the first electrode includes a first electrode catalyst layer facing the electrolyte membrane and a first gas diffusion layer arranged on an outer side of the first electrode catalyst layer and the second electrode includes a second electrode catalyst layer facing the electrolyte membrane and a second gas diffusion layer arranged on an outer side of the second electrode catalyst layer,
    the second electrode catalyst layer is designed to have an area larger than that of the second gas diffusion layer so that an outer edge portion of the second electrode catalyst layer protrudes from the second gas diffusion layer, the electrolyte membrane is designed to have an area larger than that of the second electrode catalyst layer so that an outer edge portion of the electrolyte membrane protrudes from the second electrode catalyst layer, the resin frame member has a recess in which the first electrode, the electrolyte membrane, and a portion of the second electrode catalyst layer protruding from the second gas diffusion layer are disposed, and an insertion hole which is in communication with the recess and in which the second gas diffusion layer is inserted, and a filling layer covering the outer edge portion of the second electrode catalyst layer, the filling layer covering an outermost side surface of the second electrode catalyst layer in the thickness direction, and the filling layer having an oxygen permeability of $2 \times 10^5$ ml/m$^2$·24 hr·atm or less is formed at least in a space between an inner wall of the insertion hole and the second gas diffusion layer.

2. The fuel cell according to claim 1, wherein the filling layer is also present in a space between an inner wall of the recess and the second electrode catalyst layer.

3. The fuel cell according to claim 1, wherein the filling layer is formed of an organic compound.

4. The fuel cell according to claim 3, wherein the filling layer is formed of a plastic, a rubber, or an adhesive.

5. The fuel cell according to claim 1, wherein at least one of a distance between an upper end surface of the second electrode catalyst layer and an upper end surface of the filling layer and a distance between the inner wall of the insertion hole and the second gas diffusion layer is adjusted so that an oxygen permeability of the filling layer is set to $2 \times 10^5$ ml/m$^2$·24 hr·atm or less.

6. The fuel cell according to claim 2, wherein the filling layer covers a whole surface of the outer edge portion of the second electrode catalyst layer.

7. The fuel cell according to claim 1,
wherein the first electrode further includes a first intermediate layer provided between the first electrode catalyst layer and the first gas diffusion layer, and
wherein the second electrode further includes a second intermediate layer provided between the second electrode catalyst layer and the second gas diffusion layer.

8. The fuel cell according to claim 7, wherein the second electrode catalyst layer is designed to have an area larger than that of the second intermediate layer so that an outer edge portion of the second electrode catalyst layer protrudes from the second intermediate layer.

9. A fuel cell comprising:
an electrolyte membrane electrode assembly including
an electrolyte membrane formed of a solid polymer membrane, and
a first electrode and a second electrode sandwiching the electrolyte membrane in a thickness direction; and
a resin frame member surrounding an outer wall of the electrolyte membrane electrode assembly,
wherein the first electrode includes a first electrode catalyst layer facing the electrolyte membrane and a first gas diffusion layer arranged on an outer side of the first electrode catalyst layer and the second electrode includes a second electrode catalyst layer facing the electrolyte membrane and a second gas diffusion layer arranged on an outer side of the second electrode catalyst layer, the second electrode catalyst layer is designed to have an area larger than that of the second gas diffusion layer so that an outer edge portion of the second electrode catalyst layer protrudes from the second gas diffusion layer, the electrolyte membrane is designed to have an area larger than that of the second electrode catalyst layer so that an outer edge portion of the electrolyte membrane protrudes from the second electrode catalyst layer, the resin frame member has a recess in which the first electrode, the electrolyte membrane, and a portion of the second electrode catalyst layer protruding from the second gas diffusion layer are disposed, and an insertion hole which is in communication with the recess and in which the second gas diffusion layer is inserted, a clearance having a gap is provided between an inner wall of the insertion hole and the second gas diffusion layer, and a filling layer covering the outer edge portion of the second electrode catalyst layer, the filling layer covering an outermost side surface of the second electrode catalyst layer in the thickness direction, the filling layer being formed at least in the clearance.

10. The fuel cell according to claim 9, wherein the filling layer has an oxygen permeability of $2 \times 10^5$ ml/m$^2$·24 hr·atm or less.

11. The fuel cell according to claim 10, wherein the filling layer is also present in a space between an inner wall of the recess and the second electrode catalyst layer.

12. The fuel cell according to claim 10, wherein the filling layer is formed of an organic compound.

13. The fuel cell according to claim 12, wherein the filling layer is formed of a plastic, a rubber, or an adhesive.

14. The fuel cell according to claim 10, wherein at least one of a distance between an upper end surface of the second electrode catalyst layer and an upper end surface of the filling layer and a distance between the inner wall of the insertion hole and the second gas diffusion layer is adjusted so that an oxygen permeability of the filling layer is set to $2 \times 10^5$ ml/m$^2$·24 hr·atm or less.

15. The fuel cell according to claim 11, wherein the filling layer covers a whole surface of the outer edge portion of the second electrode catalyst layer.

16. The fuel cell according to claim 10,
wherein the first electrode further includes a first intermediate layer provided between the first electrode catalyst layer and the first gas diffusion layer, and
wherein the second electrode further includes a second intermediate layer provided between the second electrode catalyst layer and the second gas diffusion layer.

17. The fuel cell according to claim 16, wherein the second electrode catalyst layer is designed to have an area larger than that of the second intermediate layer so that an outer edge portion of the second electrode catalyst layer protrudes from the second intermediate layer.

18. The fuel cell according to claim 16, wherein the filling layer is in direct contact with and entirely covers the outermost side surface of the second electrode catalyst layer.

19. The fuel cell according to claim 16, wherein the resin frame member is spaced apart from the second electrode catalyst layer in the direction orthogonal to the thickness direction.

20. The fuel cell according to claim 16, wherein the resin frame member is spaced apart from the second gas diffusion layer in the direction orthogonal to the thickness direction to provide the clearance.

21. The fuel cell according to claim 16, wherein the outermost side surface of the second electrode catalyst layer extends parallel to the thickness direction.

22. The fuel cell according to claim 16,
- wherein the filling layer covers an outermost side surface of the electrolyte membrane in the thickness direction, and
- wherein the filling layer covers an outermost side surface of the first electrode catalyst layer in the thickness direction.

23. The fuel cell according to claim 1, wherein the filling layer is in direct contact with and entirely covers the outermost side surface of the second electrode catalyst layer.

24. The fuel cell according to claim 1, wherein the resin frame member is spaced apart from the second electrode catalyst layer in the direction orthogonal to the thickness direction.

25. The fuel cell according to claim 1, wherein the resin frame member is spaced apart from the second gas diffusion layer in the direction orthogonal to the thickness direction to provide the clearance.

26. The fuel cell according to claim 1, wherein the outermost side surface of the second electrode catalyst layer extends parallel to the thickness direction.

27. The fuel cell according to claim 1,
- wherein the filling layer covers an outermost side surface of the electrolyte membrane in the thickness direction, and
- wherein the filling layer covers an outermost side surface of the first electrode catalyst layer in the thickness direction.

* * * * *